United States Patent
Miyauchi

(10) Patent No.: US 12,348,159 B2
(45) Date of Patent: Jul. 1, 2025

(54) POWER GENERATION ELEMENT HAVING MAGNETOSTRICTIVE PORTION WITH MAGNETIC MATERIAL AND MAGNET

(71) Applicant: CANON KABUSHIKI KAISHA, Tokyo (JP)

(72) Inventor: Yuichiro Miyauchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 17/822,695

(22) Filed: Aug. 26, 2022

(65) Prior Publication Data
US 2022/0407435 A1    Dec. 22, 2022

Related U.S. Application Data

(63) Continuation of application No. PCT/JP2021/004548, filed on Feb. 8, 2021.

(30) Foreign Application Priority Data

Feb. 28, 2020 (JP) .................. 2020-033350

(51) Int. Cl.
  *H02N 2/18* (2006.01)
  *H01F 27/28* (2006.01)

(52) U.S. Cl.
  CPC ............ *H02N 2/186* (2013.01); *H01F 27/28* (2013.01)

(58) Field of Classification Search
  CPC ........ H02K 33/00; H02K 33/02; H02K 33/04; H02K 33/06; H02K 35/02; H02K 35/00; H02K 35/04; H02N 2/186; H02N 2/188

(Continued)

(56) References Cited

U.S. PATENT DOCUMENTS

| 358,682 | A | * | 3/1887 | Long | .................. H02K 33/16 |
| | | | | | 310/36 |
| 4,135,119 | A | * | 1/1979 | Brosens | ................. H01F 7/145 |
| | | | | | 318/128 |

(Continued)

FOREIGN PATENT DOCUMENTS

| JP | S57169214 A | 10/1982 |
| JP | 2013-208031 A | 10/2013 |
| JP | 2015029377 A | 2/2015 |

OTHER PUBLICATIONS

JP2013208031A English Translation.*
JP2015029377A English Translation.*

*Primary Examiner* — Maged M Almawri
(74) *Attorney, Agent, or Firm* — Canon U.S.A., Inc. IP Division

(57) ABSTRACT

A power generation element includes a magnetostrictive material having a fixed end in a longitudinal direction, and generates power when force is applied to the magnetostrictive material. The power generation element includes a magnetostrictive portion containing the magnetostrictive material, a magnetic portion containing a magnetic material and having surfaces at least partially fixed to the magnetostrictive portion, a coil for enclosing at least a part of the magnetostrictive material, and a first and second magnetic field generation portions to generate a magnetic field that are fixed to the magnetostrictive portion to sandwich the coil, all of which configuring a magnetic circuit. Out of the first and the second magnetic field generation portions, the magnetic field generated from the first magnetic field generation portion close to the fixed end is larger than that generated from the second magnetic field generation portion.

13 Claims, 9 Drawing Sheets

(58) Field of Classification Search
USPC .............. 310/26, 28–36, 12.12, 12.15, 12.01
See application file for complete search history.

(56) References Cited

U.S. PATENT DOCUMENTS

| | | | | |
|---|---|---|---|---|
| 4,439,700 | A * | 3/1984 | Menzel | F16K 31/082 310/27 |
| 6,405,599 | B1 * | 6/2002 | Patt | G01N 3/02 73/779 |
| 6,876,284 | B2 * | 4/2005 | Wright | H01F 7/066 335/229 |
| 8,360,392 | B2 * | 1/2013 | Biester | F16K 11/07 335/223 |
| 8,387,945 | B2 * | 3/2013 | Cope | F16K 31/082 335/229 |
| 10,160,010 | B2 * | 12/2018 | Chun | H02K 33/16 |
| 10,468,928 | B2 * | 11/2019 | Jiang | H02K 1/34 |
| 10,944,340 | B2 * | 3/2021 | Ueno | H10N 35/01 |
| 2004/0150277 | A1 * | 8/2004 | Moriyasu | H02K 33/18 310/15 |
| 2005/0140219 | A1 * | 6/2005 | Sanematsu | H02K 33/16 310/15 |
| 2005/0185241 | A1 * | 8/2005 | Johnson | H02K 33/02 359/227 |
| 2005/0230973 | A1 * | 10/2005 | Fripp | H02K 35/04 290/1 R |
| 2006/0175909 | A1 * | 8/2006 | Kraus | B26B 19/282 310/12.31 |
| 2006/0255664 | A1 * | 11/2006 | Kraus | H02K 33/16 310/36 |
| 2006/0255665 | A1 * | 11/2006 | Kraus | H02K 33/18 310/36 |
| 2007/0040457 | A1 * | 2/2007 | Shimizu | A61C 17/3445 310/15 |
| 2007/0085425 | A1 * | 4/2007 | Hirashima | H02K 33/16 310/15 |
| 2008/0278008 | A1 * | 11/2008 | Roberts | H02K 35/06 310/29 |
| 2010/0176664 | A1 * | 7/2010 | Roberts | H02K 35/02 310/25 |
| 2010/0289359 | A1 * | 11/2010 | Knaian | H02K 21/44 310/195 |
| 2011/0101796 | A1 * | 5/2011 | Odajima | H02K 33/16 310/25 |
| 2011/0133577 | A1 * | 6/2011 | Lee | H02K 33/18 310/15 |
| 2011/0198945 | A1 * | 8/2011 | Nakagawa | H02K 33/16 310/12.25 |
| 2012/0119596 | A1 * | 5/2012 | Doll | H02K 16/02 310/36 |
| 2012/0249804 | A1 * | 10/2012 | Suzuki | B81C 1/00658 348/E3.05 |
| 2013/0342032 | A1 * | 12/2013 | Laurent | H02K 35/04 310/306 |
| 2014/0054980 | A1 * | 2/2014 | Andrikowich | H02K 7/14 310/12.31 |
| 2014/0097709 | A1 * | 4/2014 | Ueno | H02N 2/18 310/26 |
| 2014/0333156 | A1 * | 11/2014 | Toyoda | H10N 35/101 310/26 |
| 2014/0346902 | A1 * | 11/2014 | Ueno | H10N 35/101 310/26 |
| 2015/0137627 | A1 * | 5/2015 | Katada | H02K 33/16 310/25 |
| 2016/0006332 | A1 * | 1/2016 | Liao | H02K 33/16 310/29 |
| 2016/0314923 | A1 * | 10/2016 | Tsuneyoshi | H02K 7/1876 |
| 2016/0359401 | A1 * | 12/2016 | Deak, Sr. | H02K 35/02 |
| 2017/0093306 | A1 * | 3/2017 | Ueno | H02N 2/188 |
| 2018/0131371 | A1 * | 5/2018 | Liu | H03K 17/94 |
| 2018/0183300 | A1 * | 6/2018 | Fukumoto | H02K 35/02 |
| 2018/0191232 | A1 * | 7/2018 | Zou | H01F 41/0233 |
| 2018/0301969 | A1 * | 10/2018 | Takahashi | H04M 19/04 |
| 2018/0316244 | A1 * | 11/2018 | Fukumoto | H02K 7/1861 |
| 2018/0342938 | A1 * | 11/2018 | Fei | B63H 1/36 |
| 2019/0097512 | A1 * | 3/2019 | Liu | H02K 7/1876 |
| 2019/0229601 | A1 * | 7/2019 | Liao | H02K 7/003 |
| 2020/0076287 | A1 * | 3/2020 | Takahashi | H02K 33/06 |
| 2020/0076288 | A1 * | 3/2020 | Nerubenko | F16F 7/1005 |
| 2021/0135543 | A1 * | 5/2021 | Deak, Sr. | H02K 1/34 |
| 2021/0351339 | A1 * | 11/2021 | Ueno | H10N 35/101 |
| 2022/0360198 | A1 * | 11/2022 | Haronian | H02N 2/18 |
| 2023/0170778 | A1 * | 6/2023 | Haronian | H02N 11/002 310/15 |

* cited by examiner

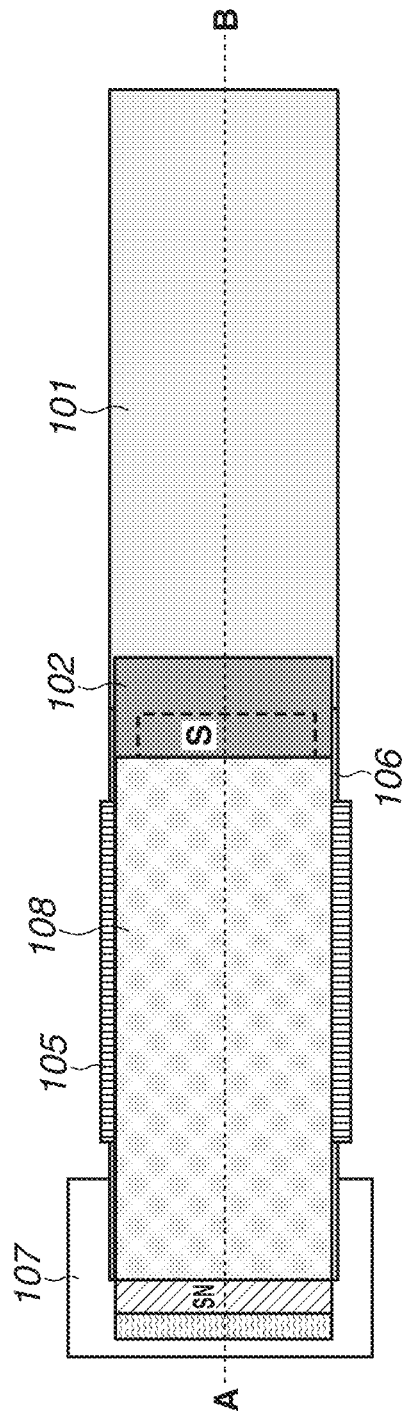
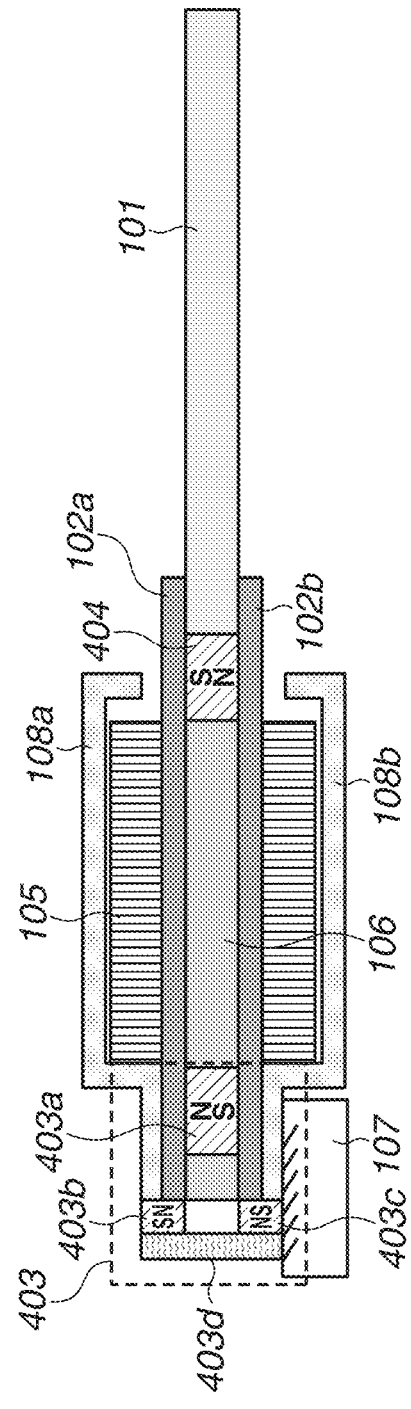
FIG.4A
FIG.4B

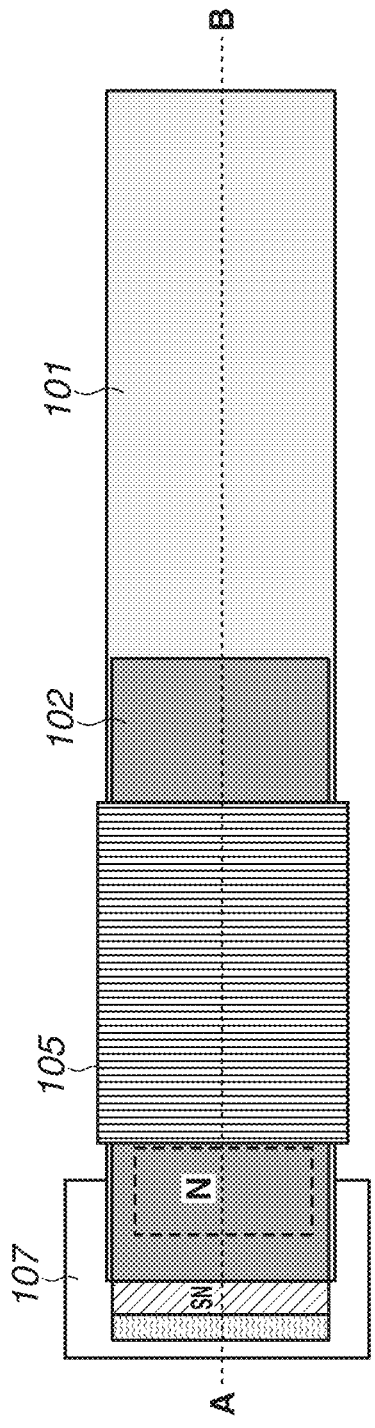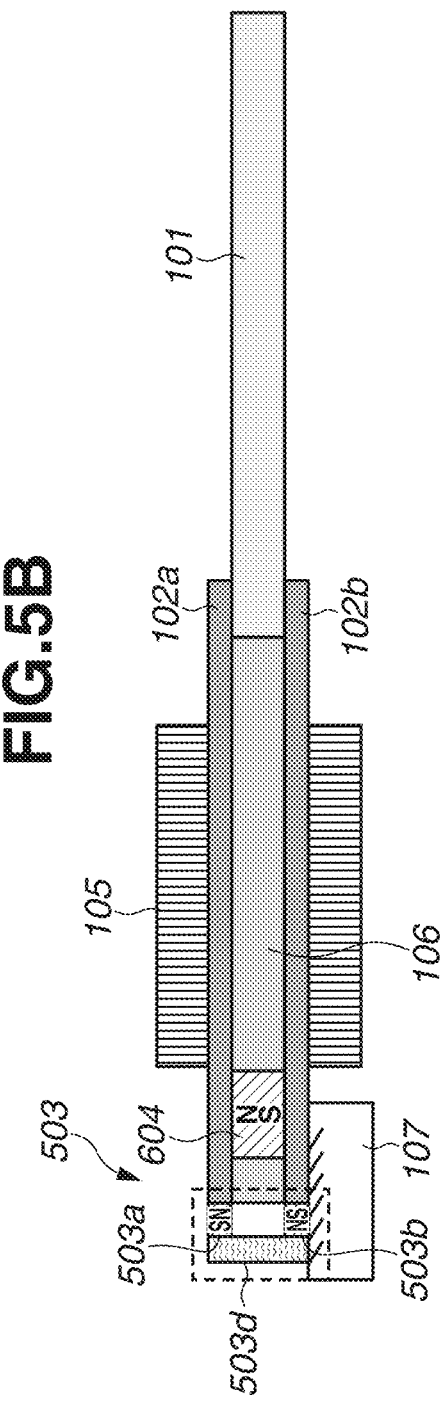

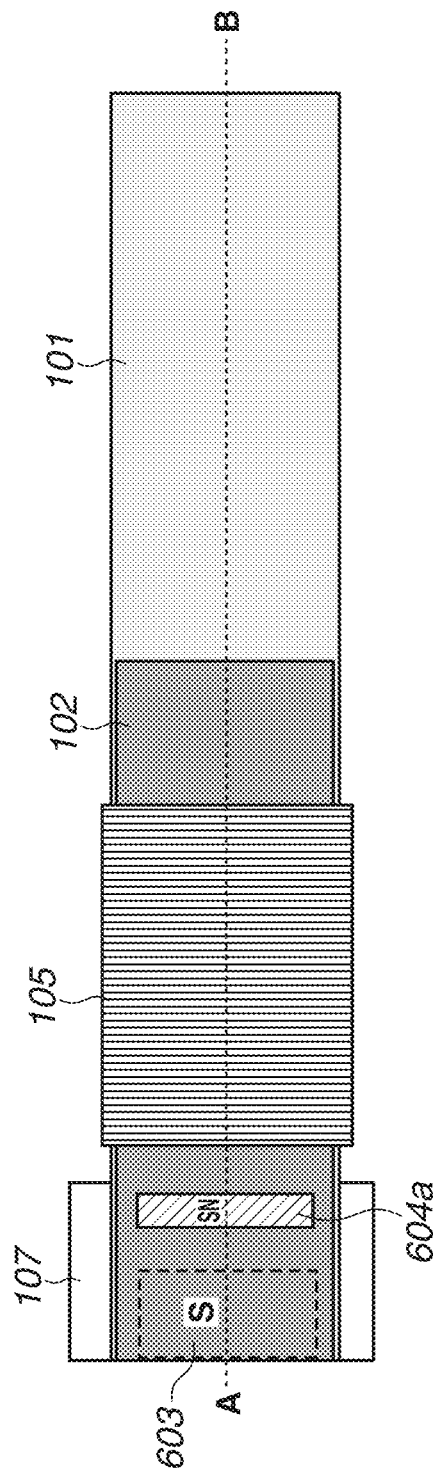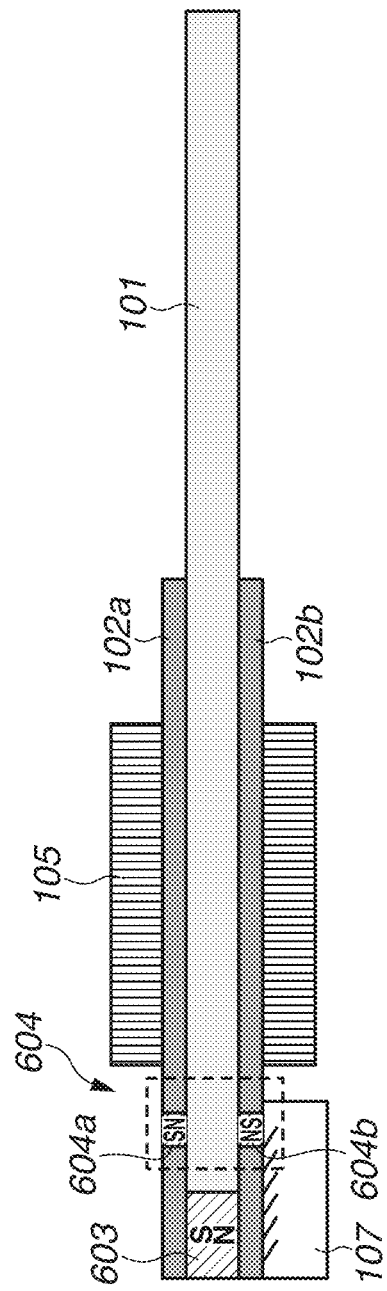

POWER GENERATION ELEMENT HAVING MAGNETOSTRICTIVE PORTION WITH MAGNETIC MATERIAL AND MAGNET

CROSS-REFERENCE TO RELATED APPLICATIONS

This application is a Continuation of International Patent Application No. PCT/JP2021/004548, filed Feb. 8, 2021, which claims the benefit of Japanese Patent Application No. 2020-033350, filed Feb. 28, 2020, both of which are hereby incorporated by reference herein in their entirety.

BACKGROUND OF THE INVENTION

Field of the Invention

The disclosure of the present specification relates to a power generation element and an apparatus using the power generation element.

Background Art

In recent years, an "energy harvesting" technology that acquires power from unused energy existing in the environment has been attracting attention as an energy saving technique. In particular, vibration power generation acquiring power from vibration has been proposed to be applied to a power supply for constantly-communicating Internet of Things (IoT), charging of a mobile device, and other applications because the vibration power generation is higher in energy density than thermoelectric generation that acquires power from heat. For example, a movable-magnet power generation method that vibrates a magnet by vibration in the environment to generate an induced electromotive force in a coil has been applied in various forms. Further, in recent years, power generation using an inverse magnetostrictive phenomenon in which a magnetic flux density is changed by change in force in place of vibration of a magnet (hereinafter, referred to as inverse magnetostrictive power generation) has been proposed.

PTL 1 discusses an inverse magnetostrictive power generation element having a configuration in which two magnetostrictive rods are disposed in parallel, and a magnet is bonded to the magnetostrictive rods. Furthermore, PTL 2 discusses an inverse magnetostrictive power generation element having a configuration in which a magnet is disposed so as to be sandwiched between magnetostrictive members.

However, the existing method has an issue that large power cannot be necessarily generated because a sufficient and uniform magnetic field cannot be applied to a magnetostrictive material.

CITATION LIST

Patent Literatures

PTL 1: Japanese Patent No. 4905820
PTL 2: Japanese Patent No. 5954406

SUMMARY OF THE INVENTION

In consideration of the above-described issue, the disclosure of the present specification is directed to a power generation element that can improve a power generation amount in power generation using a magnetostrictive material, and to an apparatus using the power generation element.

The disclosure of the present specification is directed not only to the power generation element and the apparatus described above, but also to a technique achieving an advantageous effect that is derived from respective configurations of exemplary embodiments described below but is not achievable by the existing technique.

The present invention is directed to not only the foregoing but also providing an effect that can be produced by each configuration described in an exemplary embodiment to be described below and is not produced by conventional techniques is also positioned as another aim.

A power generation element includes a magnetostrictive material and generates power when force is applied to the magnetostrictive material, the magnetostrictive material having a fixed end in a longitudinal direction. The power generation element includes a magnetostrictive portion containing the magnetostrictive material, a magnetic portion containing a magnetic material and having surfaces at least partially fixed to the magnetostrictive portion, a coil configured to enclose at least a part of the magnetostrictive material, and a first magnetic field generation portion and a second magnetic field generation portion each of which being fixed to the magnetostrictive portion to sandwich the coil and being configured to generate a magnetic field. The magnetostrictive portion, the magnetic portion, the coil, the first magnetic field generation portion, and the second magnetic field generation portion configure a magnetic circuit. Out of the first magnetic field generation portion and the second magnetic field generation portion, the magnetic field generated from the first magnetic field generation portion close to the fixed end is larger than the magnetic field generated from the second magnetic field generation portion.

Further features of the present invention will become apparent from the following description of exemplary embodiments with reference to the attached drawings.

BRIEF DESCRIPTION OF THE DRAWINGS

FIG. 4A is a schematic diagram illustrating an example of a configuration of a power generation element according to a second exemplary embodiment.

FIG. 4B is a schematic diagram illustrating the example of the configuration of the power generation element according to the second exemplary embodiment.

FIG. 5A is a schematic diagram illustrating an example of a configuration of a power generation element according to a third exemplary embodiment.

FIG. 5B is a schematic diagram illustrating the example of the configuration of the power generation element according to the third exemplary embodiment.

FIG. 6A is a schematic diagram illustrating an example of a configuration of a power generation element according to a fourth exemplary embodiment.

FIG. 6B is a schematic diagram illustrating the example of the configuration of the power generation element according to the fourth exemplary embodiment.

DESCRIPTION OF THE EMBODIMENTS

Some preferred exemplary embodiments of the present invention are described in detail below with reference to accompanying drawings. The disclosure of the present specification is not limited to the exemplary embodiments described below. Various modifications (including organic combinations of each exemplary embodiment) can be made based on the spirit of the disclosure of the present specification, and the various modifications are not excluded from the scope of the disclosure of the present specification. In other words, combined configurations of the exemplary embodiments and the modifications described below are all included in the exemplary embodiments disclosed in the present specification.

First Exemplary Embodiment

A power generation element according to a first exemplary embodiment is a power generation element that generates power by using an inverse magnetostrictive phenomenon in which a magnetic flux density is changed by change in force in place of vibration of a magnet. The power generation element according to the present exemplary embodiment is a power generation element that includes a magnetostrictive material and generates power when force is applied to the magnetostrictive material. The magnetostrictive material has one fixed end in a longitudinal direction. In the power generation element, magnetic force of a magnetic field generation portion on the fixed end side is stronger than magnetic force of a magnetic field generation portion on another end side, which makes magnetic field distribution inside a magnetostrictive plate uniform and improves an inverse magnetostrictive effect.

(Configuration of Power Generation Element)

Figure 1A:
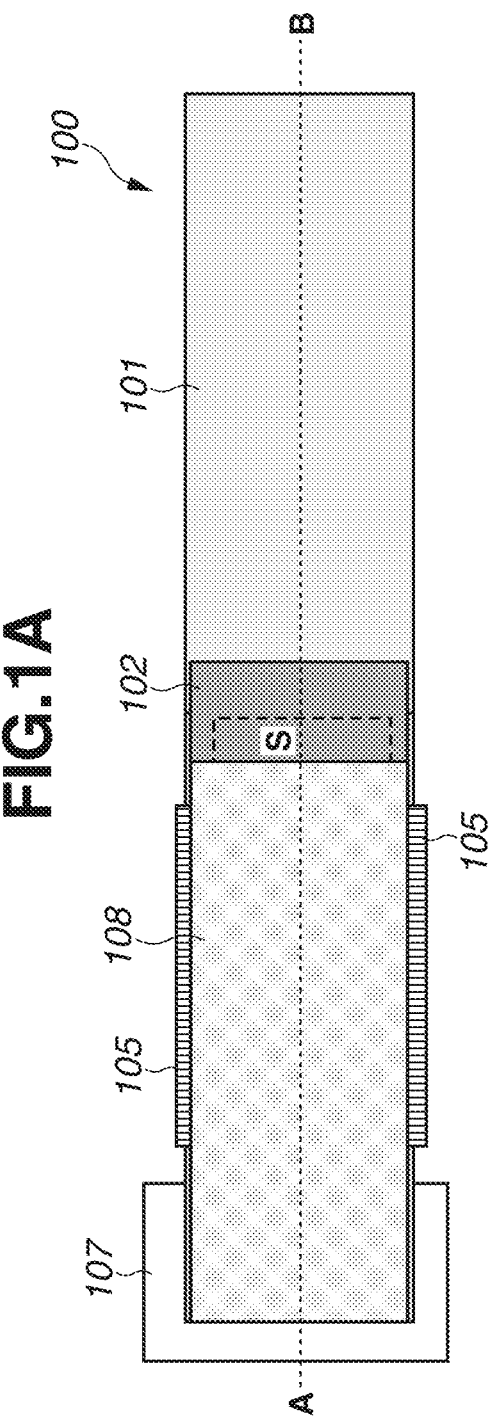
FIG. 1A is a schematic diagram illustrating an example of a configuration of a power generation element according to a first exemplary embodiment.
Figure 1B:
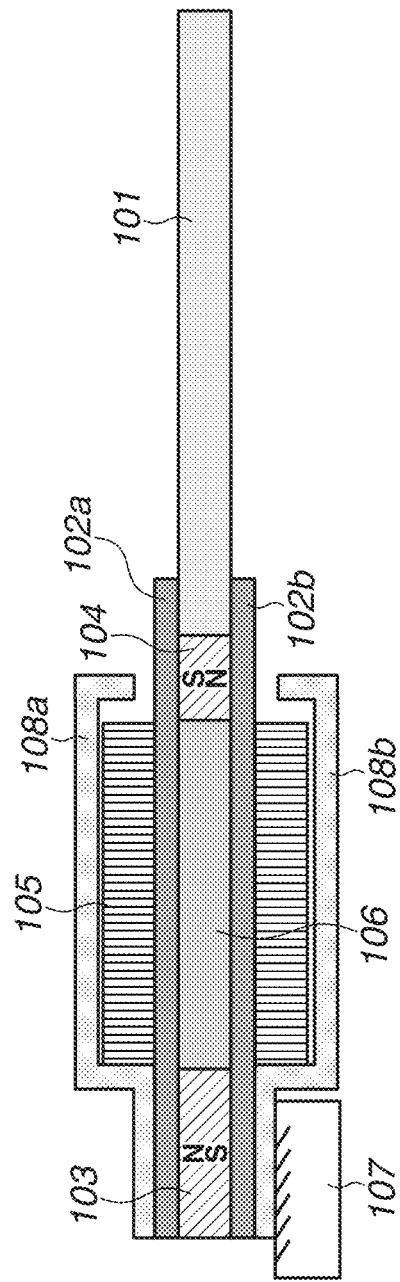
FIG. 1B is a schematic diagram illustrating the example of the configuration of the power generation element according to the first exemplary embodiment.

A configuration of the power generation element according to the present exemplary embodiment is described with reference to FIG. 1A and FIG. 1B. FIG. 1A is a schematic top view illustrating a configuration of the power generation element according to the present exemplary embodiment. FIG. 1B is a schematic cross-sectional view taken along line A-B in FIG. 1A illustrating the configuration of the power generation element according to the present exemplary embodiment.

A power generation element 100 according to the present exemplary embodiment is held by a holding portion 107, and includes a coupling plate 101, a magnetostrictive portion 102 including a magnetostrictive plate 102a and a magnetostrictive plate 102b, a first magnet 103 included in a first magnetic field generation portion, a second magnet 104 included in a second magnetic field generation portion, a coil 105, a non-magnetic area 106, and a magnetic portion 108 including a magnetic plate 108a and a magnetic plate 108b. In the following, "fixing" of one member and another member indicates a state where the two members are physically fixed to each other. In other words, the two members may be fixed so as to be in contact with each other, or may be fixed through a different material. Further, in the present exemplary embodiment, a direction of the line A-B is defined as a longitudinal direction. In other words, in an object that receives pressure, a direction extending from a fixed end toward an end receiving the pressure is defined as the longitudinal direction. The definition of the direction is not limited to the above-described definition.

The coupling plate 101 has one end fixed to the magnetostrictive portion 102, and vibrates by receiving external force such as compression stress and tensile stress. A coupling method of the coupling plate 101 is not particularly limited as long as the magnetostrictive portion 102 and the coupling plate 101 are firmly fixed. Examples of the coupling method include laser welding, adhesion with an adhesive, solder joining, ultrasonic joining, and fixing by a bolt and a nut. Further, since the coupling plate 101 continuously receives external force, such as compression stress and tensile stress, the coupling plate 101 is preferably made of a material having ductility. The material of the coupling plate 101 is selected based on a magnetic circuit configuration with the magnetostrictive portion 102. Thus, in a case where the coupling plate 101 is used as an element configuring a magnetic circuit, a magnetic material, such as carbon steel, ferritic stainless steel (i.e., SUS430), or martensitic stainless steel (i.e., SUS420J2) is used. In contrast, in a case where the coupling plate 101 is not used as the element configuring the magnetic circuit, a non-magnetic material, such as austenitic stainless steel (i.e., SUS304, SUS303, and SUS316) is used.

Force is applied to the coupling plate 101 such that the coupling plate 101 vibrates in a vertical direction in FIG. 1B. Thus, an elastic material such as a spring material may be used for the coupling plate 101 in order to reduce mechanical attenuation of the vibration. Force inducing the vibration in the vertical direction in FIG. 1B can be generated by, for example, application of ground vibration caused by fixing of the holding portion 107 to a vibration source vertically vibrating, or by operation in which force is applied to a front end of the coupling plate 101 opposite to a connection portion thereof and the front end of the coupling plate 101 is flipped. For example, a mechanism applying the force or a mechanism applying the ground vibration may be integrated with the power generation element 100 inside a housing, as a power generation apparatus.

The above-described force application methods are merely illustrative, and any other method to apply the force to the magnetostrictive portion 102 can be used. The materials used for the above-described coupling plate 101 are illustrative and are not limited thereto.

The magnetostrictive plate 102a and the magnetostrictive plate 102b configuring the magnetostrictive portion 102 are members each containing a magnetostrictive material. The magnetostrictive portion 102 continuously receives compression stress and tensile stress. Thus, the magnetostrictive portion 102 preferably contains a magnetostrictive material having ductility. Although a type of the magnetostrictive material is not particularly limited, a well-known magnetostrictive material is preferably used, such as an iron-gallium alloy, an iron-cobalt alloy, an iron-aluminum alloy, an iron-gallium-aluminum alloy, and an iron-silicon-boron alloy. Further, a shape of the magnetostrictive portion 102 is not particularly limited as long as the magnetostrictive portion 102 is coupled with the coupling plate 101, and a rectangular-parallelepiped shape, a columnar shape, or the like is preferably used.

Materials of the magnetic plates 108a and 108b are not particularly limited as long as the magnetic plates 108a and 108b are respectively magnetically connected to the magnetostrictive plates 102a and 102b. For the materials, carbon steel, ferritic stainless steel (i.e., SUS430), or martensitic stainless steel (i.e., SUS420J2) is used. Further, the magnetostrictive portion 102 and the magnetic portion 108 are coupled. A coupling method is not particularly limited as long as the magnetostrictive portion 102 and the magnetic portion 108 are firmly fixed. Examples of the coupling method includes laser welding, adhesion with an adhesive, solder joining, ultrasonic joining, and fixing by a bolt and a nut.

The first magnet 103 included in the first magnetic field generation portion and the second magnet 104 included in the second magnetic field generation portion are attached to magnetize the magnetostrictive plate 102a and the magnetostrictive plate 102b in opposite directions. Although not particularly limited, a neodymium magnet, a samarium-cobalt magnet, or the like is used for each of the first magnet 103 and the second magnet 104.

Although not particularly limited, the first magnet 103 and the second magnet 104 are desirably disposed such that magnetization directions are opposite to each other as illustrated in the schematic cross-sectional view in FIG. 1B. However, the magnetization directions of the magnets in the schematic cross-sectional view in FIG. 1B are illustrative, and a north (N) pole and a south (S) pole may be reversed from the illustrated poles. In other words, it is sufficient that a magnetic pole surface of the first magnet 103 and a magnetic pole surface of the second magnet 104 different from each other are fixed to the same surface of the magnetostrictive portion 102. Further, strength of the magnetic force of the first magnetic field generation portion and strength of the magnetic force of the second magnetic field generation portion are not particularly limited as long as the strength of the magnetic force of the first magnetic field generation portion is greater than the strength of the magnetic force of the second magnetic field generation portion. For example, as illustrated in FIG. 1B, the first magnet 103 included in the first magnetic field generation portion may be greater in size than the second magnet 104 included in the second magnetic field generation portion. Alternatively, the first magnet 103 included in the first magnetic field generation portion may be greater in magnetic force than the second magnet 104 included in the second magnetic field generation portion even if the first magnet 103 and the second magnet 104 each have the same size. Alternatively, as illustrated in FIG. 4B, the magnetic field in a coil axis direction at a position of the magnetostrictive plate in the first magnetic field generation portion may be enhanced as compared with the second magnetic field generation portion, by configuring the first magnetic field generation portion by a plurality of magnets.

The layout of the first magnetic field generation portion and the second magnetic field generation portion is not particularly limited to the above-described layout as long as the magnetostrictive plate 102a and the magnetostrictive plate 102b are magnetized in the opposite directions. Although not particularly limited, a neodymium magnet, a samarium-cobalt magnet, or the like is used as each of the magnets.

The coil 105 is disposed to enclose at least a part of each of the magnetostrictive plate 102a and the magnetostrictive plate 102b, and generates a voltage based on temporal change of the magnetic fluxes generated by the magnetostrictive plate 102a and the magnetostrictive plate 102b according to the law of electromagnetic induction. This makes it possible to increase the number of turns of the coil 105 irrespective of a distance between the two magnetostrictive plates 102a and 102b.

Although not particularly limited, a copper wire is preferably used as a material of the coil 105.

Although not particularly limited, gas or a solid is used as a material of the non-magnetic area 106. Air, a non-magnetic metal having ductility, or austenitic stainless steel (i.e., SUS304, SUS303, and SUS316) is preferably used. Further, the non-magnetic area 106 may be integrated with the coupling plate 101.

The power generation element 100 may be integrated with the holding portion 107 and enclosed in the housing, which makes it possible to improve robustness as the power generation apparatus including the power generation element 100. Although a material of the housing is not particularly limited, if carbon steel, ferritic stainless steel (i.e., SUS430), or martensitic stainless steel (i.e., SUS420J2) that is a magnetic material is used, it is possible to achieve an effect of a magnetic shield, and to reduce influence of external magnetism.

(Action)

The power generation element 100 according to the present exemplary embodiment is a type of an electromagnetic induction power generation element that converts change in magnetic flux into a voltage by the coil. In the electromagnetic induction, electromotive force V is generated based on the following formula (1), $$V = N \times \Delta\Phi / \Delta t. \quad (1)$$

In the formula (1), N is the number of turns of the coil 105, and $\Delta\Phi$ is a change amount of magnetic flux in the coil 105 in a time $\Delta t$. The electromotive force is increased as the number of turns of the coil 105 is increased; however, to increase the number of turns with the same volume, it is necessary to reduce a wire diameter of the coil 105, which results in increase in resistance of the coil 105. In this case, the power actually usable in the circuit or the like is reduced. In other words, to increase the power actually usable in the circuit or the like, a configuration in which the volume of the coil can be increased is important.

The power generation element 100 according to the present exemplary embodiment is a power generation element generating the change amount of magnetic flux $\Delta\Phi$ by the inverse magnetostrictive phenomenon. The inverse magnetostrictive phenomenon is a phenomenon in which magnetic permeability is changed based on stress. However, in a case where the magnetic field is small, the change in the magnetic permeability is small because energy is consumed to align magnetic domains in the magnetic field direction. When a larger magnetic field is applied, the directions of the magnetic domains are aligned and magnetization is easily changed, which increases change in the magnetic permeability. When a larger magnetic field is further applied, change in the magnetic permeability is reduced because magnetic saturation occurs. Thus, in a case where an appropriate magnetic field is not applied to the magnetostrictive material, the change in the magnetic permeability is excessively small. Accordingly, it is necessary to apply the appropriate magnetic field to the magnetostrictive material. In addition, it is not enough for the appropriate magnetic field to be large because of the above-described reason. Thus, it is necessary to uniformly apply the magnetic field to the magnetostrictive material. Furthermore, a magnetic body to induce the change in the magnetic flux generated by the change in the magnetic permeability, to outside of the coil is necessary.

Action of the present exemplary embodiment is described in detail with reference to FIGS. 2A and 2B.

Figure 2A:
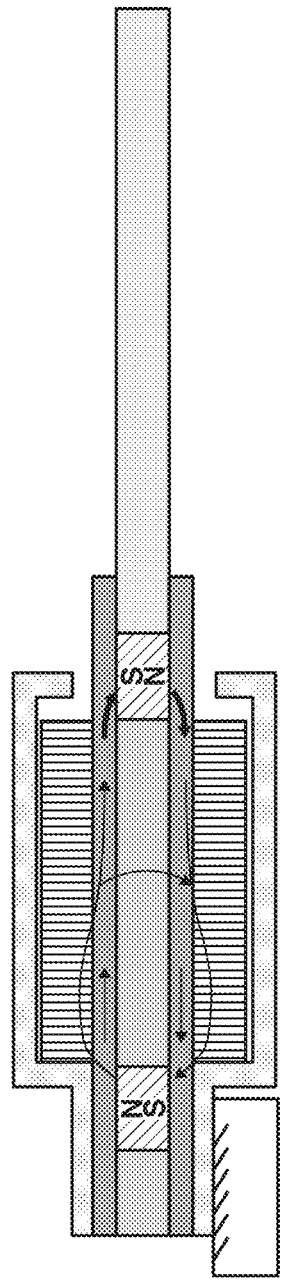
FIG. 2A is a schematic diagram illustrating an example of a principle of the power generation element according to the first exemplary embodiment.

FIG. 2A is a schematic cross-sectional view schematically illustrating, by an arrow and a thickness thereof, a direction and a magnitude of the magnetic flux density passing through the magnetostrictive plates of the power generation element that generates power by using the inverse magnetostrictive phenomenon. FIG. 2B is a schematic cross-sectional view schematically illustrating, by an arrow and a thickness thereof, a direction and a magnitude of the magnetic flux density of the power generation element 100 illustrated in FIGS. 1A and 1B as an example of the present exemplary embodiment.

In FIG. 2A, in the first magnetic field generation portion, the magnetic flux leaks to an area on the magnetic portion 108 side because of presence of the magnetic portion 108. In contrast, near the second magnetic field generation portion, the magnetic resistance between the magnetic plate and the magnetostrictive plate is increased, and leakage of the magnetic flux to outside of the magnetostrictive plate is small because the magnetic plate and the magnetostrictive plate are not bonded to each other. Accordingly, the magnetic flux density near the first magnet 103 is less than the magnetic flux density near the second magnet 104. As a result, the magnetic flux density distribution inside the magnetostrictive plates becomes nonuniform. As described above, in the inverse magnetostrictive power generation, the magnetic flux density distribution inside the magnetostrictive plates is nonuniform due to various kinds of structures.

Figure 2B:
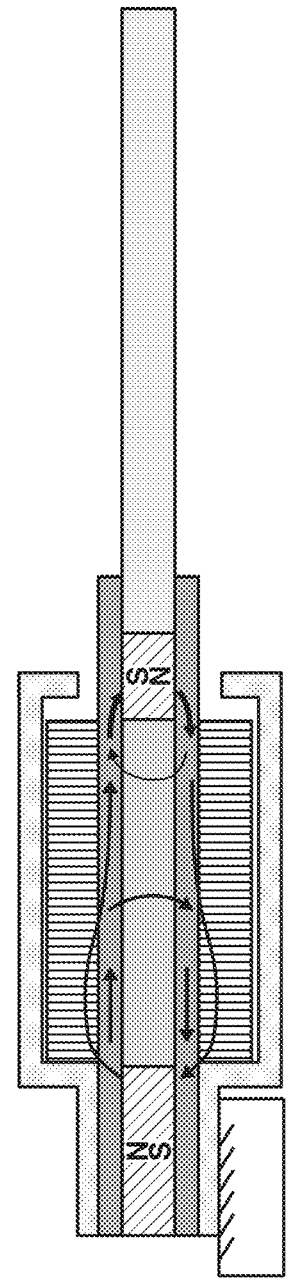
FIG. 2B is a schematic diagram illustrating the example of the principle of the power generation element according to the first exemplary embodiment.

In contrast, if a plurality of magnetic field generation portions different in magnetic force is provided as illustrated in FIG. 2B according to the present exemplary embodiment, the magnetic flux density distribution can be uniformized, and the power generation amount can be improved.

In other words, the power generation element 100 according to the present exemplary embodiment can apply a uniform magnetic field to the magnetostrictive material while inducing change in the magnetic flux generated by the change in the magnetic permeability, to the outside of the coil 105.

Further, if the power generation element 100 according to the above-described exemplary embodiment is used, the power generation amount greater than a power generation amount by an existing magnetostrictive power generator, which enables downsizing of the power generator. Accordingly, this is particularly effective as the power generator for an apparatus, installation of the power generator of which is difficult due to the size so far. The power generation element can be used as a power generator for, for example, a mobile device. Further, if the power generation element is installed in an industrial apparatus, such as an office apparatus, a medical apparatus, an automobile, a railroad vehicle, an aircraft, a heavy machine, or a vessel that generates vibration, the power generation element can be expected to be used as a power source of various kinds of apparatuses including an Internet of Things (IoT) apparatus. Since the present exemplary embodiment can improve performance of the power generator, the present exemplary embodiment can be applied to various fields other than the above-described fields.

(First Modification)

In the present exemplary embodiment, the state where the magnetic force of the first magnetic field generation portion is greater than the magnetic force of the second magnetic field generation portion is realized by making the sizes of the magnets included in the first magnetic field generation portion and the second magnetic field generation portion different from each other.

However, the effects by the present exemplary embodiment can also be achieved by configuring the first magnetic field generation portion by a plurality of magnets as illustrated in FIGS. 4A and 4B.

More specifically, a magnet 403b and a magnet 403c are fixed to the magnetostrictive portion 102 such that a magnetization direction of each of the magnet 403b and the magnet 403c is substantially orthogonal to a magnetization direction of a magnet 403a, and the magnet 403b and the magnet 403c are reversed in polarity. Further, a magnetic material is fixed to surfaces of the magnet 403b and the magnet 403c opposed to surfaces fixed to the magnetostrictive portion 102. In other words, the magnet 403b corresponds to a third magnet that is fixed to a surface of the magnetostrictive portion 102 substantially orthogonal to a surface of the magnetostrictive portion 102 where the first magnet is fixed, and is fixed to a magnetic material on a surface opposed to the surface fixed to the magnetostrictive portion 102. The magnet 403c corresponds to a fourth magnet that has a magnetic pole surface different from the magnetic pole surface of the third magnet, fixed to the surface of the magnetostrictive portion 102 substantially orthogonal to the surface of the magnetostrictive portion 102 where the first magnet is fixed, and is fixed to the magnetic material on a surface opposed to the surface fixed to the magnetostrictive portion 102.

According to the above description, configuring the first magnetic field generation portion by the plurality of magnets makes it possible to uniformize the magnetic flux density distribution inside the magnetostrictive plates, and to improve the power generation amount. More specifically, configuring the first magnetic field generation portion by the plurality of magnets, for example, as illustrated in FIGS. 4A and 4B makes it possible to uniformize the magnetic flux density distribution.

(Second Modification)

In the present exemplary embodiment, the state where the magnetic force of the first magnetic field generation portion is greater than the magnetic force of the second magnetic field generation portion is realized by making the sizes of the magnets included in the first magnetic field generation portion and the second magnetic field generation portion different from each other.

Figure 8A:
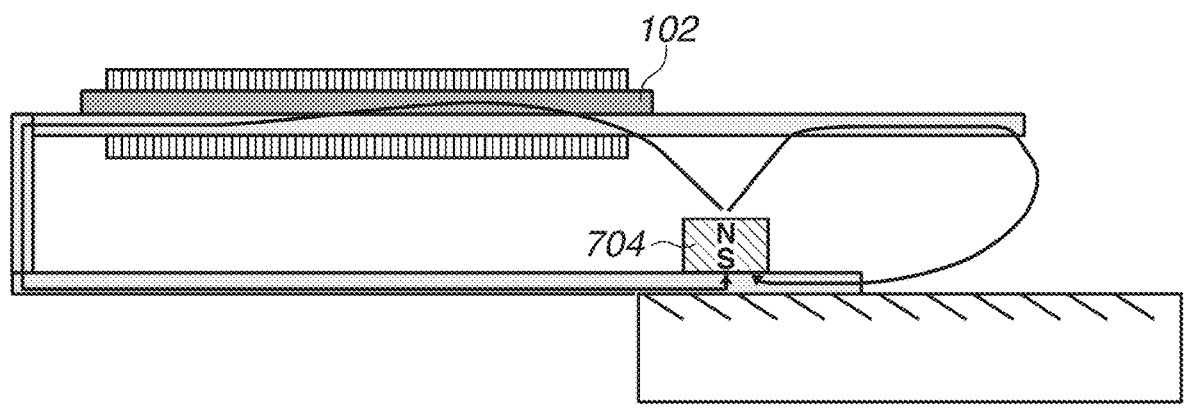
FIG. 8A is a schematic diagram illustrating an example of a principle of a power generation element according to the fifth exemplary embodiment.
Figure 8B:
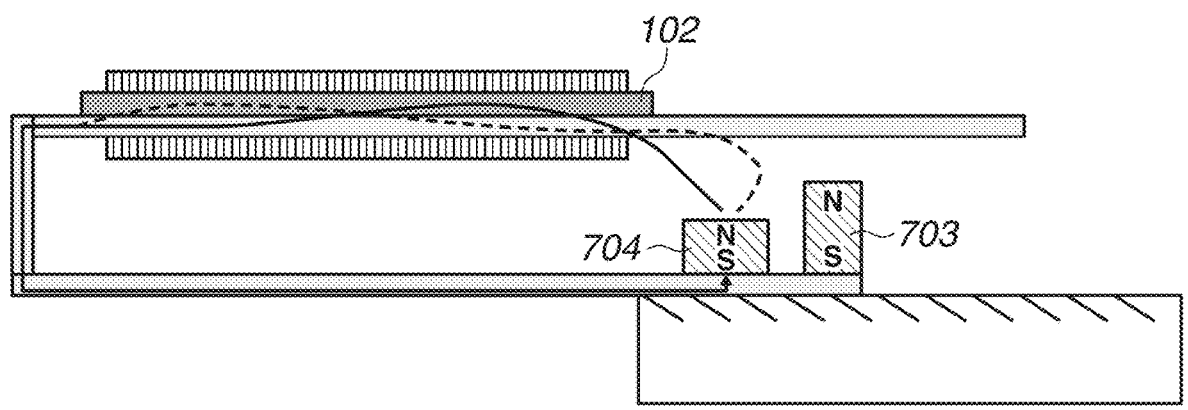
FIG. 8B is a schematic diagram illustrating the example of the principle of the power generation element according to the fifth exemplary embodiment.

However, the effects by the present exemplary embodiment can be achieved even when the magnet is disposed on only one side of the coil as illustrated in FIGS. 8A and 8B.

For example, providing a plurality of magnetic field generation portions different in magnetic force as illustrated in FIG. 8B as an example of the present exemplary embodiment makes it possible to uniformize the magnetic flux density distribution, and to increase the power generation amount. More specifically, in FIG. 8A, a magnetic flux generated by a magnet 704 mainly passes through right and left paths in the drawing. In contrast, in FIG. 8B as an example of the present exemplary embodiment, a magnet 703 different in magnetic force is provided. As a result, the right path of the magnetic flux of the magnet 704 in FIG. 8A is changed to a path illustrated by a dashed line in FIG. 8B.

As a result, the above-described configuration can uniformize the magnetic flux density distribution of a magnetostrictive portion 102, and increase the power generation amount.

EXAMPLES

The present exemplary embodiment is described in detail below with reference to specific examples. The present exemplary embodiment is not limited to configurations and forms of the following examples.

First Example (Method of Manufacturing Power Generation Element)

In the present example, a power generation element illustrated in FIGS. 3A to 3F was fabricated. Manufacturing steps are described below with reference to FIGS. 3A to 3F.

An upper diagram in each of FIGS. 3A to 3F is a schematic top view, and a lower diagram is a schematic cross-sectional view taken along line A-B illustrated in the corresponding schematic top view.

As the coupling plate 101, a plate that was made of SUS304-CSP as austenitic stainless steel for spring and had a thickness of 1.0 millimeters (mm), a width of 16 mm, and a length of 35 mm was used. As a holding plate 301, a plate that was made of SUS304 having a thickness of 1.0 mm, a width of 16 mm, and a length of 5 mm was used. A reason for use of the austenitic stainless steel was because the austenitic stainless steel was a non-magnetic metal, and reduced magnetic flux leakage between the magnetostrictive plate 102a and the magnetostrictive plate 102b. Further, a reason for use of the spring material was because it was revealed as a result of study that mechanical attenuation of the power generation element relating to power generation performance was small as compared with a case where a normal stainless material was used [FIG. 3A].

Next, as each of the magnetostrictive plates 102a and 102b, a plate that was made of an iron-gallium alloy having a thickness of 0.5 mm, a width of 15 mm, and a length of 25 mm was used, and the magnetostrictive plates 102a and 102b were bonded to the coupling plate 101 and the holding plate 301 with an epoxy adhesive. Thereafter, the magnetostrictive plates 102a and 102b are joined by performing laser welding on ridge lines in contact with the coupling plate 101 and the holding plate 301 among ridge lines of the magnetostrictive plates 102a and 102b [FIG. 3B].

Subsequently, holding screw holes 302 to fix the power generation element by using bolts or the like were fabricated in the magnetostrictive plates 102a and 102b and the coupling plate 101. The screw holes 302 enabled installation of the power generation element at various places. In power generation amount evaluation in the present example, spacers each having a screw hole were disposed on an optical platen, and the power generation element was fixed to the above-described spacers through the above-described holding screw holes 302 with bolts [FIG. 3C].

Figure 3A:
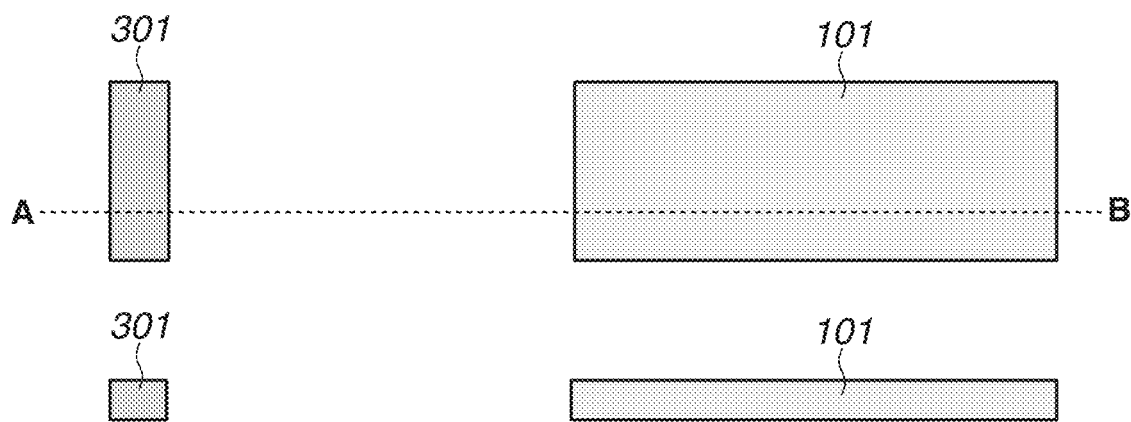
FIG. 3A is a schematic diagram illustrating an example of a method of manufacturing the power generation element according to the first exemplary embodiment.
Figure 3B:
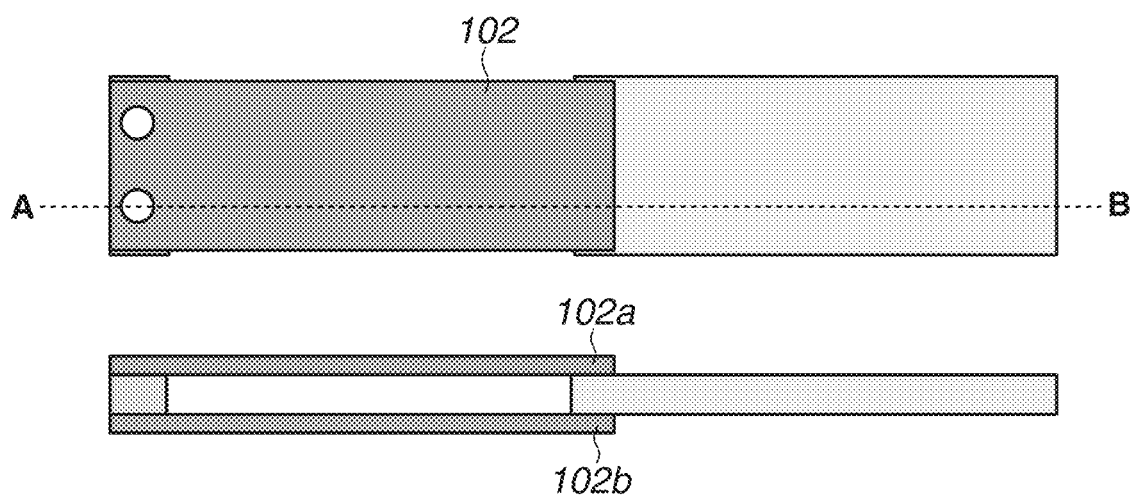
FIG. 3B is a schematic diagram illustrating an example of the method of manufacturing the power generation element according to the first exemplary embodiment.
Figure 3C:
FIG. 3C is a schematic diagram illustrating an example of the method of manufacturing the power generation element according to the first exemplary embodiment.
Figure 3D:
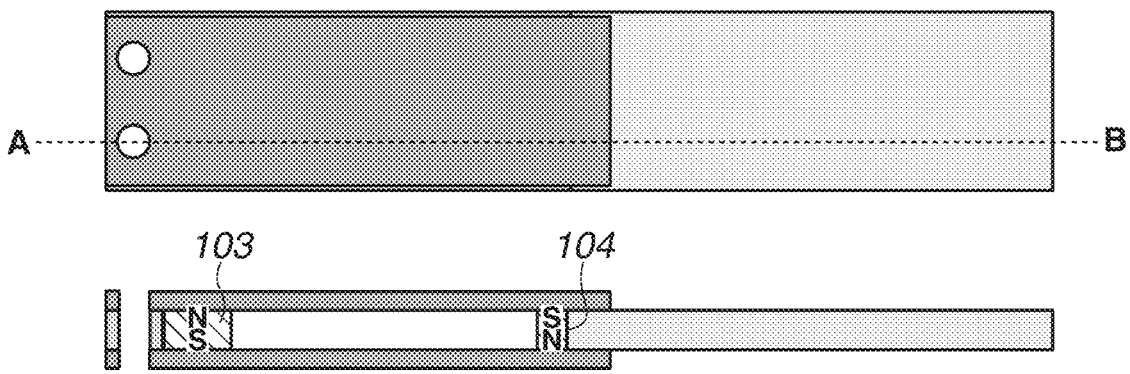
FIG. 3D is a schematic diagram illustrating an example of the method of manufacturing the power generation element according to the first exemplary embodiment.

Next, a neodymium magnet having a thickness of 1.0 mm, a width of 12 mm, and a length of 2.0 mm was used as the first magnet 103, and a neodymium magnet having a thickness of 1.0 mm, a width of 12 mm, and a length of 1.0 mm was used as the second magnet 104. The first magnet 103 and the second magnet 104 were inserted such that the magnetization directions were opposite to each other as illustrated in FIG. 3D. After the insertion, the first magnet 103 and the second magnet 104 were bonded and fixed between the magnetostrictive plates 102a and 102b with an epoxy adhesive [FIG. 3D].

Figure 3E:
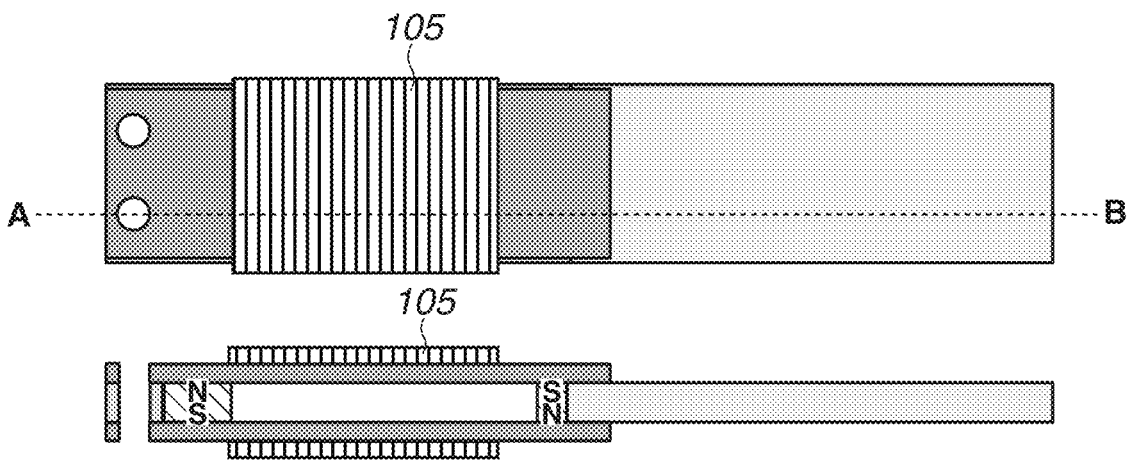
FIG. 3E is a schematic diagram illustrating an example of the method of manufacturing the power generation element according to the first exemplary embodiment.
Figure 3F:
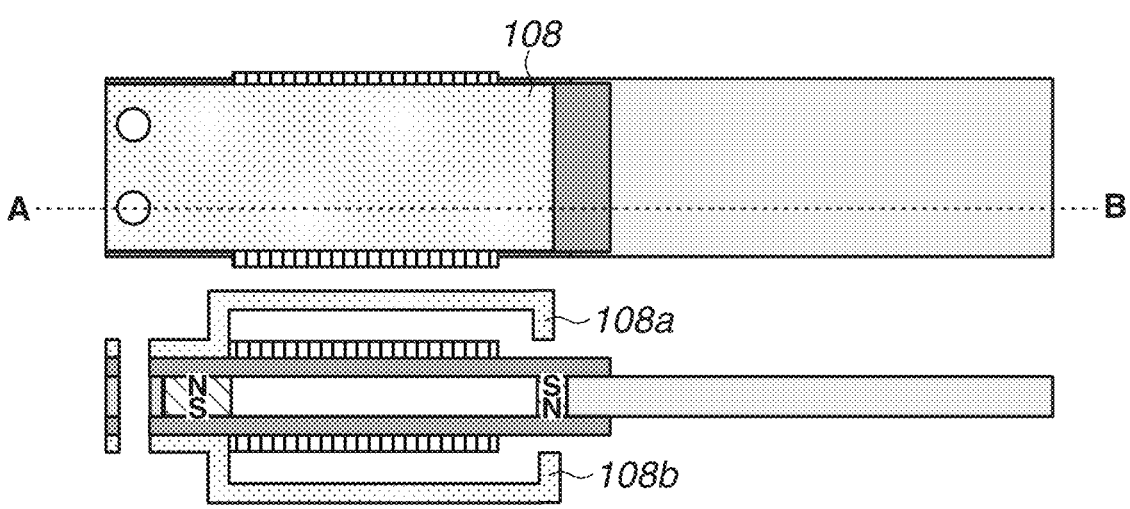
FIG. 3F is a schematic diagram illustrating an example of the method of manufacturing the power generation element according to the first exemplary embodiment.

Next, an air-core coil in which a copper wire having a wire diameter of 0.1 mm was turned 2000 times was inserted, as the coil 105, into an area between the first magnet 103 and the second magnet 104 so as to enclose the magnetostrictive plates 102a and 102b, and was fixed with electric insulation varnish [FIG. 3E].

Finally, as each of the magnetic plates 108a and 108b for adjustment of change in the magnetic flux, a cold-rolled steel sheet SPCC having a thickness of 1.5 mm, a width of 15 mm, and a length of 25 mm was used. The magnetic plates 108a and 108b were then fixed by using the screw holes 302 [FIG. 3F].

(Evaluation of Power Generation Element)

Power generation performance of the power generation element fabricated in the above-described manner was evaluated by vibrating a fixed portion by a vibrator and measuring an open voltage generated in the coil 105 by using an oscilloscope. A frequency generated by the vibrator was 100 hertz (Hz), and a vibration acceleration was 1 G. Further, a spindle having a natural frequency of 100 Hz was disposed at a front end of the power generator. As a quantitative index of power generation performance, a power generation amount P calculated by the following formula (2) from a voltage waveform measured by the oscilloscope was used, $$P=\Sigma(V(t))^2/(4\times R)\times \Delta t/t. \qquad (2)$$

In the formula (2), V(t) was the open voltage at a time t measured by the oscilloscope, R was an electric resistance of the coil, $\Delta t$ was temporal resolution of the oscilloscope, and $\Sigma$ was summation with the time t. In the expression of the power generation amount P, an effect by an inductance of the coil was eliminated. This is because a coil having similar dimensions was used in the present example and a comparative example, which enabled relative comparison. As a result of the measurement and the evaluation by the above-described method, the electric resistance of the coil was 180 ohms ($\Omega$), the maximum value of the open voltage was 6.5 volts (V), and the power generation amount P was 13 milli-joules (mJ) from the formula (2).

Second Example

In the present example, the power generation element illustrated in FIGS. 4A and 4B was fabricated. As in the present example, a magnetic field generation portion 403 was configured by a plurality of magnets 403a, 403b, and 403c that are spatially distanced, and the magnet 403b and the magnet 403c were configured to be reversed in magnetic poles. Further, the magnetic poles of the magnet 403a, the magnet 403b, and the magnet 403c were configured to have positional relationship generating magnetic fields in the opposite directions inside the magnetostrictive plates. As a result, it was found that the magnetic flux density distribution inside the magnetostrictive portion 102 is uniformized, and increase of the power generation amount can be expected.

The manufacturing method was similar to the manufacturing method in the first example; however, a step was added as a final step in which the magnet 403b and the magnet 403c that were bonded to a plate 403d made of SPCC and having a thickness of 1 mm, were bonded to positions illustrated in FIGS. 4A and 4B with an epoxy resin. As each of the magnet 403a and a magnet 404, a neodymium magnet having a thickness of 1.0 mm, a width of 12 mm, and a length of 1.0 mm was used. As each of the magnets 403b and 403c, a neodymium magnet having a thickness of 1.5 mm, a length of 1.5 mm, and a width of 12 mm was used.
(Evaluation of Power Generation Element)

Power generation performance of the power generation element fabricated in the above-described manner was evaluated in a manner similar to that in the first example. As a result of the evaluation, the electric resistance of the coil was 180Ω, the maximum value of the open voltage was 7 V, and the power generation amount P was 15 mJ.

Third Example

In the present example, a power generation element illustrated in FIGS. 5A and 5B was fabricated. The manufacturing method was similar to the manufacturing method in the second example; however, the magnet was provided only on the fixed portion side of the coil 105. Providing the magnet only on the fixed portion side enabled downsizing and simplification of the power generation element. This was effective to cost reduction and the like. The sizes and the types of the components, the magnetization directions of the magnets, and the like were basically similar to those in the second example; however, the material of the coupling plate 101 was changed to SUS420J2 a martensitic stainless steel. Such a configuration made it possible to reduce the magnet on a free end side, and to simplify the process.
(Evaluation of Power Generation Element)

Power generation performance of the power generation element fabricated in the above-described manner was evaluated in a manner similar to that in the first example. As a result of the evaluation, the electric resistance of the coil was 180Ω, the maximum value of the open voltage was 5.5 V, and the power generation amount P was 10 mJ.

Fourth Example

In the present example, a power generation element illustrated in FIGS. 6A and 6B was fabricated. The manufacturing method was basically similar to the manufacturing method in the first example; however, the magnet was provided only on the fixed portion side of the coil 105. Further, the manufacturing method in the fourth example was different from the manufacturing method in the first example in that slits for arrangement of magnets 604a and 604b were provided in the magnetostrictive plates 102a and 102b, a neodymium magnet having a thickness of 1.0 mm, a width of 12 mm, and a length of 1.0 mm was used as a magnet 603, and a neodymium magnet having a thickness of 0.5 mm, a length of 0.5 mm, and a width of 12 mm was used as each of the magnets 604a and 604b. Further, the material of the coupling plate 101 was changed from the material in the first example, and SUS420J2 a martensitic stainless steel was used for the coupling plate 101.
(Evaluation of Power Generation Element)

Power generation performance of the power generation element fabricated in the above-described manner was evaluated in a manner similar to that in the first example. As a result of the evaluation, the electric resistance of the coil was 180Ω, the maximum value of the open voltage was 6 V, and the power generation amount P was 12 mJ.

Fifth Example

Figure 7:
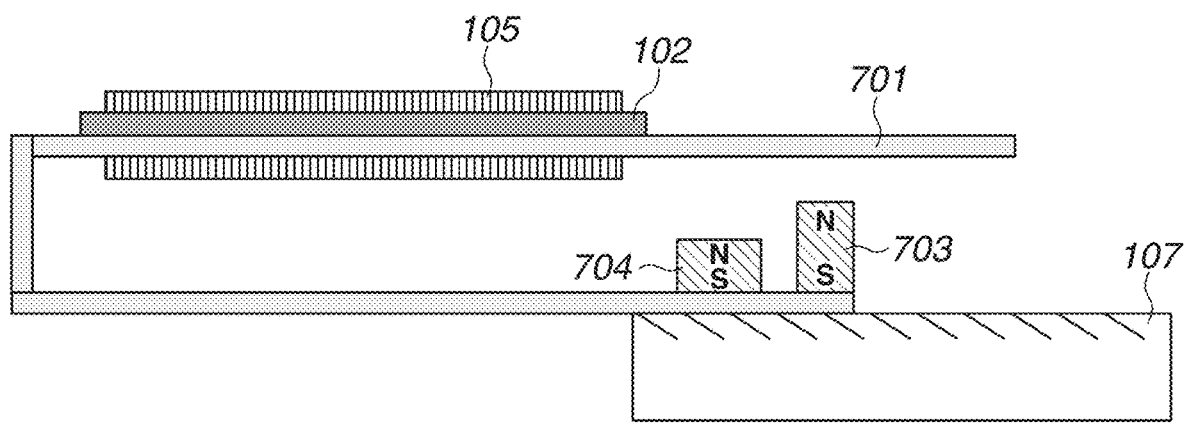
FIG. 7 is a schematic diagram illustrating an example of a configuration of a power generation element according to a fifth exemplary embodiment.

In the present example, a power generation element illustrated in FIG. 7 was fabricated. As a coupling plate 701, a plate that was made of SUS420J2 having a thickness of 1.0 mm and a U-shape was used. Further, a neodymium magnet having a thickness of 3 mm, a length of 7 mm, and a width of 7 mm was used as a magnet 704, and a neodymium magnet having a thickness of 4 mm, a length of 3 mm, and a width of 3 mm was used as a magnet 703. The magnets and the coupling plate 701 were fixed by adhesion with an epoxy resin.
(Evaluation of Power Generation Element)

Power generation performance of the power generation element fabricated in the above-described manner was evaluated in a manner similar to that in the first example. As a result of the evaluation, the electric resistance of the coil was 180Ω, the maximum value of the open voltage was 5 V, and the power generation amount P was 8 mJ.

First Comparative Example

In the present comparative example, unlike the power generation elements in the first example in FIGS. 1A and 1B and in the second example in FIGS. 4A and 4B, a power generation element only including the first magnet 103 and the second magnet 104 having the same size was fabricated. A neodymium magnet having a thickness of 1.0 mm, a width of 12 mm, and a length of 1.0 mm was used as each of the magnets.
(Evaluation of Power Generation Element)

Power generation performance of the power generation element fabricated in the above-described manner was evaluated in a manner similar to that in the first example. As a result of the evaluation, the electric resistance of the coil was 180Ω, the maximum value of the open voltage was 6 V, and the power generation amount P was 8 mJ.

Second Comparative Example

In the present comparative example, unlike the power generation elements in the third example in FIGS. 5A and 5B or in the fourth example in FIGS. 6A and 6B, a power generation element including only one magnet was fabricated. The magnet had a thickness of 1.0 mm, a width of 12 mm, and a length of 1.0 mm
(Evaluation of Power Generation Element)

Power generation performance of the power generation element fabricated in the above-described manner was evaluated in a manner similar to than in the first example. As a result of the evaluation, the electric resistance of the coil was 180Ω, the maximum value of the open voltage was 6 V, and the power generation amount P was 8 mJ.

Third Comparative Example

In the present comparative example, unlike the power generation element in the fifth example in FIG. 7, a power generation element not including the magnet 703 was fabricated.

(Evaluation of Power Generation Element)

Power generation performance of the power generation element fabricated in the above-described manner was evaluated in a manner similar to that in the first example. As a result of the evaluation, the electric resistance of the coil was 180Ω, the maximum value of the open voltage was 3 V, and the power generation amount P was 3 mJ.

Although the exemplary embodiments and the examples of the present invention have been specifically described, the present invention is not limited to the above-described exemplary embodiments. The present invention can be variously modified based on the technical idea. For example, the numerical values and the components described in the above-described exemplary embodiments are merely illustrative. Different numerical values and different components may be used as necessary.

The present invention is not limited to the above-described exemplary embodiments, and can be variously alternated and modified without departing from the spirit and the scope of the present invention. Therefore, the following claims are attached to make the scope of the present invention public.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A power generation element including a magnetostrictive material and generating power when force is applied to the magnetostrictive material, the magnetostrictive material having a fixed end in a longitudinal direction, the power generation element comprising:
   a magnetostrictive portion containing the magnetostrictive material;
   a magnetic portion containing a magnetic material and having surfaces at least partially fixed to the magnetostrictive portion;
   a coil configured to enclose at least a part of the magnetostrictive material; and
   a first magnetic field generation portion and a second magnetic field generation portion each of which being fixed to the magnetostrictive portion to sandwich the coil and being configured to generate a magnetic field,
   wherein the magnetostrictive portion, the magnetic portion, the coil, the first magnetic field generation portion, and the second magnetic field generation portion configure a magnetic circuit, and
   wherein, out of the first magnetic field generation portion and the second magnetic field generation portion, the magnetic field generated from the first magnetic field generation portion close to the fixed end is larger than the magnetic field generated from the second magnetic field generation portion.

2. The power generation element according to claim 1,
   wherein the magnetostrictive portion includes a first magnetostrictive plate and a second magnetostrictive plate, and
   wherein at least a part of the first magnetic field generation portion and at least a part of the second magnetic field generation portion are disposed between the first magnetostrictive plate and the second magnetostrictive plate.

3. The power generation element according to claim 1, wherein the magnetic portion is fixed to a surface of the magnetostrictive portion, and the first magnetic field generation portion and the second magnetic field generation portion are fixed to a surface of the magnetostrictive portion opposed to the surface where the magnetic portion is fixed.

4. The power generation element according to claim 1, further comprising a holding plate configured to vibrate by receiving external force,
   wherein the holding plate has one end fixed to the magnetostrictive portion.

5. A power generation apparatus, comprising:
   the power generation element according to claim 1; and
   a mechanism configured to apply force to the power generation element.

6. A power generation apparatus, comprising:
   the power generation element according to claim 1; and
   a mechanism configured to cause the power generation element to vibrate by ground vibration.

7. The power generation element according to claim 1,
   wherein the first magnetic field generation portion includes a first magnet,
   wherein the second magnetic field generation portion includes a second magnet, and
   wherein magnetic pole surfaces of the first magnet and the second magnet different from each other are fixed to a same surface of the magnetostrictive portion.

8. The power generation element according to claim 7, wherein the second magnet is weaker in magnetic force than the first magnet.

9. A power generation apparatus, comprising:
   the power generation element according to claim 1; and
   a housing configured to house the power generation element.

10. The power generation apparatus according to claim 9, wherein the housing is made of a magnetic material.

11. The power generation element according to claim 1, wherein the first magnetic field generation portion further includes a third magnet having a magnetization direction substantially orthogonal to a magnetization direction of the first magnet.

12. The power generation element according to claim 11, wherein the third magnet is fixed to a surface of the magnetostrictive portion substantially orthogonal to a surface of the magnetostrictive portion where the first magnet is fixed, and is fixed to a magnetic material on a surface opposed to the surface fixed to the magnetostrictive portion.

13. The power generation element according to claim 11,
   wherein the first magnetic field generation portion further includes a fourth magnet having a magnetization direction substantially orthogonal to the magnetization direction of the first magnet, and
   wherein the fourth magnet has a magnetic pole surface different from a magnetic pole surface of the third magnet, is fixed to a surface of the magnetostrictive portion substantially orthogonal to the surface of the magnetostrictive portion where the first magnet is fixed, and is fixed to a magnetic material on a surface opposed to the surface fixed to the magnetostrictive portion.

* * * * *